(12) United States Patent
Chameroy et al.

(10) Patent No.: US 6,523,459 B1
(45) Date of Patent: Feb. 25, 2003

(54) SAFETY DEVICE FOR OPENING A PRESSURE COOKER WITH LUG-BAYONET TYPE CLOSURE

(75) Inventors: Eric Chameroy, Véronnes (FR); Eric Christian Jacques Rhetat, Dijon (FR); Eric Laurent Baraille, Dijon (FR)

(73) Assignee: SEB S.A. (FR)

( * ) Notice: Subject to any disclaimer, the term of this patent is extended or adjusted under 35 U.S.C. 154(b) by 0 days.

(21) Appl. No.: 09/806,142

(22) PCT Filed: Sep. 27, 1999

(86) PCT No.: PCT/FR99/02294
§ 371 (c)(1),
(2), (4) Date: Jun. 27, 2001

(87) PCT Pub. No.: WO00/18279
PCT Pub. Date: Apr. 6, 2000

(30) Foreign Application Priority Data

Sep. 28, 1998 (FR) .............................. 98 12258

(51) Int. Cl.[7] .............................. A23L 1/00; A47J 27/08; A47J 27/092; B65B 45/00; B65B 45/34
(52) U.S. Cl. .............................. 99/337; 99/403; 99/342; 220/316; 220/912
(58) Field of Search .................... 99/330, 337, 338, 99/403–407, 339, 340, 342; 126/369, 373.1, 384.1, 389.1; 219/440, 401; 220/314–316, 573.1, 293, 291, 324, 325, 203.19, 203.22, 323, 378; 292/DIG. 11, 57, 58, 63–66, 139, 140

(56) References Cited

U.S. PATENT DOCUMENTS

| | | | | |
|---|---|---|---|---|
| 2,549,387 A | * | 4/1951 | Richeson | 220/316 |
| 4,024,982 A | * | 5/1977 | Schultz | 220/293 |
| 4,135,640 A | * | 1/1979 | MacQuilkin et al. | 220/316 |
| 4,161,260 A | * | 7/1979 | Lagostina | 220/912 X |
| 4,162,741 A | * | 7/1979 | Walker et al. | 220/314 X |
| 4,574,988 A | * | 3/1986 | Karliner | 220/316 |
| 4,711,366 A | * | 12/1987 | Chen | 99/337 |
| 4,733,795 A | * | 3/1988 | Boehm | 220/316 |
| 4,796,776 A | * | 1/1989 | Dalquist et al. | 220/912 X |
| 4,932,550 A | * | 6/1990 | Moucha | 99/403 |
| 5,048,400 A | * | 9/1991 | Ueda et al. | 99/403 |
| 5,370,257 A | * | 12/1994 | Chameroy et al. | 220/293 X |
| 5,678,721 A | * | 10/1997 | Cartigny et al. | 99/337 X |

FOREIGN PATENT DOCUMENTS

| | | |
|---|---|---|
| DE | 27 05 712 | 8/1978 |
| DE | 30 33 097 A1 | 4/1982 |
| DE | 31 12 993 A | 10/1982 |
| EP | 0 736 282 A1 | 10/1996 |

* cited by examiner

Primary Examiner—Timothy F. Simone
(74) Attorney, Agent, or Firm—Lerner, David, Littenberg, Krumholz & Mentlik, LLP

(57) ABSTRACT

Pressure cookers are disclosed comprising a pan having a pan ramp, a lid having a handle and a lid ramp cooperative with the pan ramp to provide a bayonet closure, such that the pan and lid ramps can be cooperatively engaged in the closed position, an abutment for preventing further rotation of the lid, a lock mechanism for locking the lid relative to the pan, a controller to control the lock mechanism to move it an unlocking and locking positions in which the lid cannot be removed from the pan, a pressure indicator mounted with respect to the lid movable between positions in which the pressure within the pressure cooker cannot leak therethrough and is permitted to leak therethrough, and a unitary assembly mounted on the lid independent of the handle in which the pressure indicator, the controller and the lock mechanism are mounted on the unitary assembly.

10 Claims, 5 Drawing Sheets

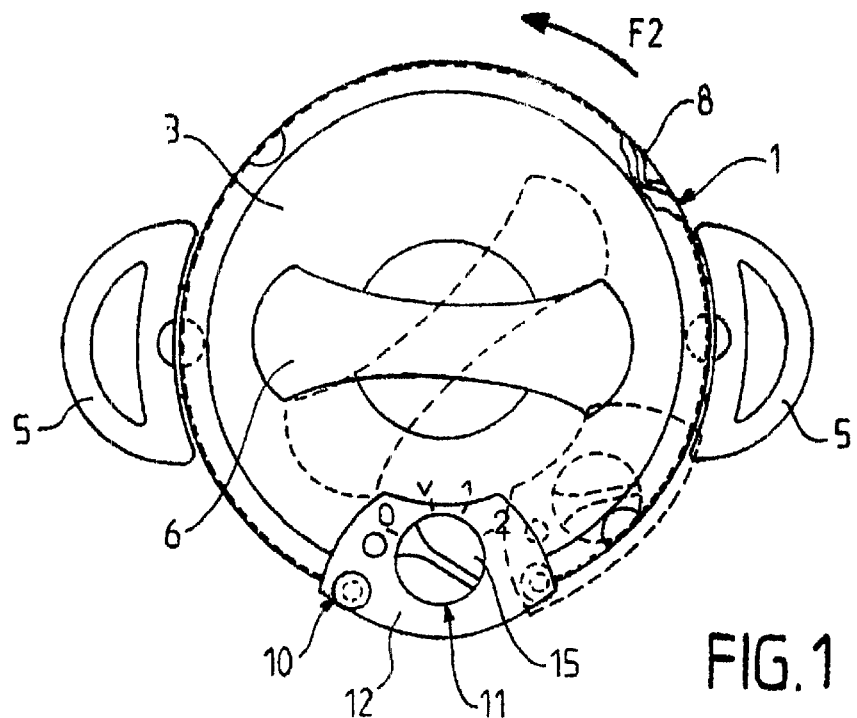
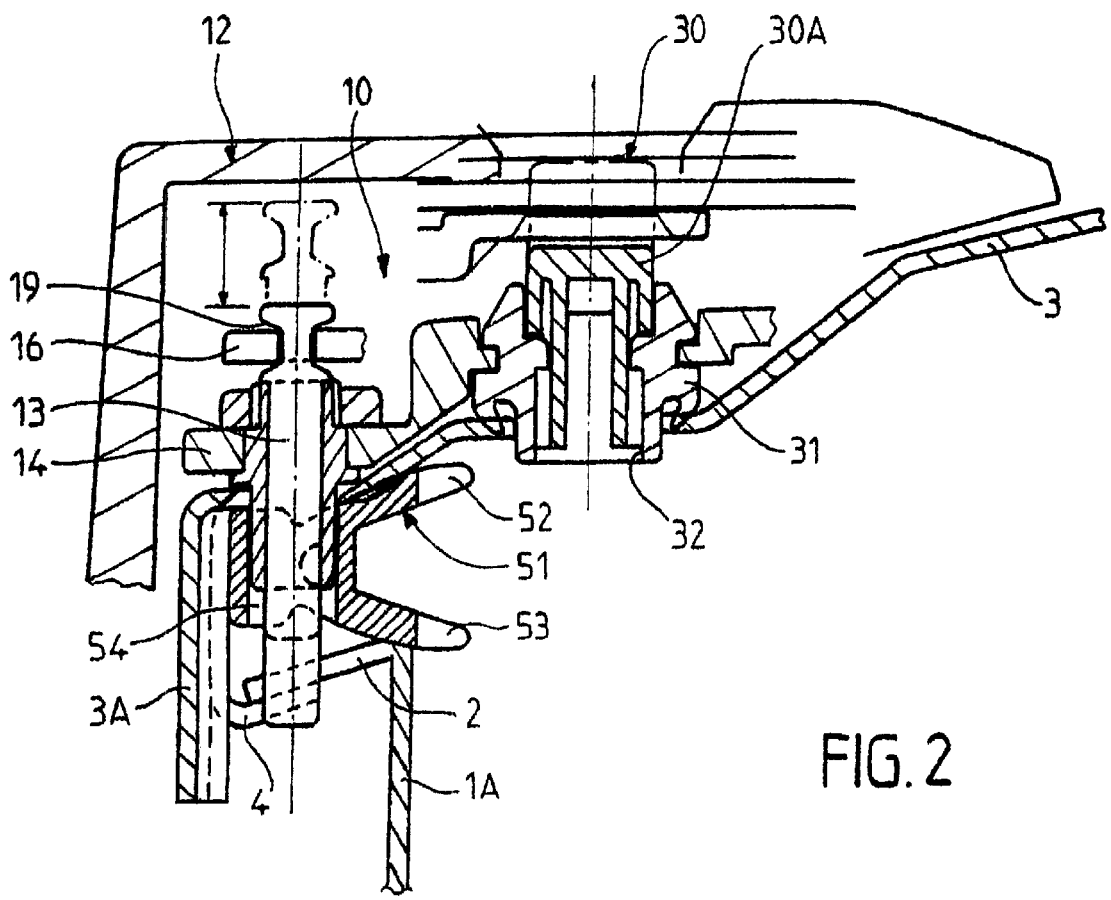

SAFETY DEVICE FOR OPENING A PRESSURE COOKER WITH LUG-BAYONET TYPE CLOSURE

FIELD OF THE INVENTION

The present invention relates to safety devices for pressure cooking appliances having bayonet closures. More particularly, the present invention relates to implementing rotary abutment means for preventing rotation of the lid relative to the pan in a direction corresponding to closing the appliance, and means for locking the lid relative to the pan under drive from control means suitable for being actuated by the user, and for taking up at least one locking position in which relative rotation between the lid and the pan is prevented.

The present invention also relates to a safety device for a pressure cooking appliance with a bayonet closure and comprising:

a pan having pan ramps;

a lid having lid ramps;

rotary abutment means for preventing the lid rotating relative to the pan, placed so that in the closed position the lid ramps engage the pan ramps, the lid and the pan then being prevented from rotating in the direction of rotation that corresponds to closing the appliance;

locking means for locking the lid relative to the pan, the locking means being mounted to move on the appliance under drive from control means suitable for being actuated by the user between at least one unlocking position enabling the appliance to be opened and at least one locking position in which relative rotation between the pan and the lid is prevented; and a pressure indicator mounted to move freely on the lid between a high, leakproof position and a low, leakage position, depending on the pressure that exists within the appliance.

Still more particularly, the present invention relates to a "bayonet" type pressure cooker fitted with an opening safety device.

BACKGROUND OF THE INVENTION

As a general rule, the locking/unlocking devices of "bayonet" type pressure cookers implement locking principles that make use of alignment between a handle of the pan and a handle of the lid to trigger displacement of a latch, displacement generally being along a radial direction relative to the axis of symmetry of the pan. Such a principle is disclosed, e.g. in French Patent No. 2,484,817 in the name of the Applicant.

French Patent No. 2,484,817 describes a pressure cooker whose handle includes a member for locking the lid relative to the pan, which member extends substantially radially relative to the wall of the pan and is mounted to be movable in a radial direction. The locking member is provided with an orifice that makes it possible, in the closed position, to pass an operating valve freely therethrough when the lid is properly closed. Incomplete closure will lead to the valve being out of alignment with the opening provided in the sliding locking member, thereby preventing any rise of pressure inside the pressure cooker, as a safety measure.

Such systems are in widespread use on "bayonet" type pressure cookers, with that known locking/unlocking principle being suitable for implementation in numerous configurations, e.g. making the locking member act either directly or indirectly when the pressure cooker is put under pressure. Furthermore, there exist numerous configurations of openings depending on the level of safety provided by the design, in association with other safety devices, e.g. making use of one or more operating valves and/or deformation of a sealing gasket.

Such systems provide the user of a pressure cooker with a level of safety that is universally recognized, but at the same time give rise to various drawbacks during design and manufacture.

Thus, it turns out that the design of pressure cookers using locking of the above type requires compliance with a chain of multiple design dimensions, which is difficult to achieve. This chain of dimensions comprises a large stack of components such as the pan, the fixing pin for the handles, the locking member, the handle of the lid, the lid, the compression of the gasket, etc. Industrially, and particularly during manufacture, this gives rise to major dimensional constraints on the manufacturer, and that constitutes a significant industrial drawback. In addition, on that type of pressure cooker, there is only one single position for relative locking between the lid and the pan.

Locking/unlocking devices for pressure cookers are also known which implement principles of locking and safety on opening that imply a certain amount of simplification. Thus, French Patent No. 1,052,130 describes a principle of locking and safety on opening implementing means for locking the lid relative to the pan, which means extends substantially parallel to the wall of the pan and is vertically movable. The locking means in this case is mounted on the lid and is associated with control means, in association with a rated operating valve. The locking means is designed to penetrate into a cavity provided in the handle of the appliance to lock the pressure cooker, while the rated operating valve is simultaneously put into action in its seat by its compression spring.

Apart from the relatively rudimentary level of safety that it provides, such a system suffers from the drawback of still requiring compliance with a considerable chain of design dimensions, and of providing an insufficient level of safety. It is possible to open the appliance while a certain amount of excess pressure still exits in the pressure cooker, since unlocking is performed simultaneously when the operating valve is freed. The level of safety is therefore not optimal.

Consequently, the objects of the present invention seek to remedy the various drawbacks enumerated above, and to propose a novel opening safety device for a pressure-cooking appliance having a bayonet closure, that has improved safety and improved handling.

Another object of the present invention is to provide a novel safety device that allows the appliance to be easily cleaned, and that allows the appliance to be cleaned in a dishwasher.

Another object of the present invention is to propose a novel safety device that is particularly simple to implement and make.

Another object of the present invention is to propose a novel safety device that is simpler to manipulate, and that provides an improved level of safety.

A further object of the present invention seeks to propose a novel safety device that is particularly robust and insensitive.

SUMMARY OF THE INVENTION

In accordance with the present invention, these and other objections have now been realized by the invention of a pressure cooker comprising a pan including a pan ramp, a lid including a handle and a lid ramp cooperative with the pan ramp to provide a bayonet closure, whereby the pan and the lid can move from an open position wherein the pan ramp and the lid ramp are not cooperatively engaged to a closed position wherein the pan ramp and the lid ramp are cooperatively engaged by rotating the lid in a first direction with respect to the pan, rotary abutment means for preventing further rotation of the lid relative to the pan in the first direction when the pan and the lid are in the closed position, a lock mechanism for locking the lid relative to the pan, a controller for controlling the lock mechanism, the controller adapted to move the lock mechanism between at least one unlocking position wherein the lid can be removed from the pan and at least one locking position wherein the lid cannot be removed from the pan, a pressure indicator mounted with respect to the lid and movable between a first position wherein pressure within the pressure cooker cannot leak therethrough and a second position wherein the pressure can leak therethrough, and a unitary assembly mounted on the lid independent of the handle, the pressure indicator, the controller and the lock mechanism being mounted on the unitary assembly. Preferably, the unitary assembly is removably mounted on the lid.

In accordance with one embodiment of the pressure cooker of the present invention, when the controller has moved the lock mechanism into the at least one unlocking position, the controller prevents the pressure indicator from moving out of the second position and when the controller has moved the lock mechanism into the at least one locking position, the pressure indicator is free to move into the first position and the lock mechanism is thereby restrained in the at least one locking position.

In accordance with another embodiment of the pressure cooker of the present invention, the controller includes a selector knob, and a lever operable by the selector knob, the lever including an end portion, the end portion of the lever movable by means of the selector knob to move the lock mechanism between the at least one unlocking position and the at least one locking position and to lock the pressure indicator in the second position. Preferably, the lock mechanism comprises a pin translatable with respect to the pan between a first upper vertical position and a second lower vertical position, the end portion of the lever comprising a helical shape for cooperating with the pin to move the pin between the first and second vertical positions.

In accordance with another embodiment of the pressure cooker of the present invention, the end portion of the lever covers the pressure indictor to lock the pressure indicator in the second position and is movable to uncover the pressure indicator in a position adjacent to the pressure indicator enabling the pressure indicator to move into the first position whereby the end portion of the lever is locked against the pressure indicator.

In accordance with another embodiment of the pressure cooker of the present invention, the pressure cooker includes a rated operating valve for setting the rating of the pressure cooker by compression thereagainst, the selector knob being operable to cause the controller to set the rating. Preferably, the selector knob includes a cam profile for moving the rated operating valve between at least two positions. In a preferred embodiment, the at least two positions correspond to the locking mechanism being in the at least one locking position, the at least two positions including a first position wherein the rated operating valve is released from any resilient compression and a second position wherein the rated operating valve is subjected to a first compression representing a first rated value. Preferably, the at least two positions includes a third position, wherein the rated operating valve is subjected to a second compression representing a second rated value.

The objects of the present invention are thus achieved by a safety device for a pressure cooking appliance with bayonet closure and comprising:

a pan having pan ramps;

a lid having lid ramps;

rotary abutment means for preventing the lid from rotating relative to the pan, placed so that in the closed position the lid ramps engage the pan ramps, the lid and the pan then being prevented from rotating in the direction of rotation that corresponds to closing the appliance;

locking means for locking the lid relative to the pan, the locking means being mounted to move on the appliance under drive from control means suitable for being actuated by the user between at least one unlocking position enabling the appliance to be opened and at least one locking position in which relative rotation between the pan and the lid is prevented; and a pressure indicator mounted to move freely on the lid between a high, leakproof position and a low, leakage position, depending on the pressure that exists within the appliance, and wherein the pressure indicator, the control means, and the locking means form part of a unitary assembly that is mounted on the lid and that is independent of the handles of the cooking appliance.

BRIEF DESCRIPTION OF THE DRAWINGS

The objects of the present invention will be understood in greater detail with reference to the following detailed description which, in turn, makes reference to the accompanying drawings, given purely by way of non-limiting illustration, and in which:

FIG. 1 is a top, plan view of a safety device of the present invention fitted to a pressure cooker;

FIG. 2 is a side, elevational, fragmentary cross-sectional view showing a detail of the safety device of the present invention;

DETAILED DESCRIPTION

Figure 3:
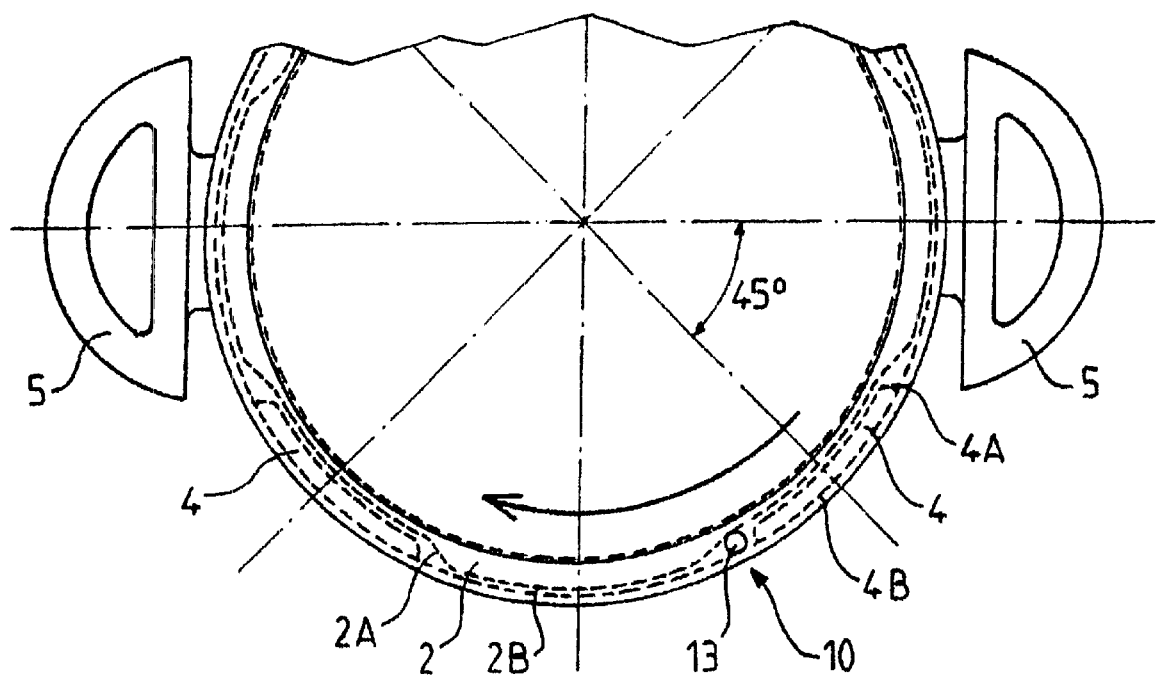
FIG. 3 is a top, fragmentary plan view of a pressure cooker showing the safety device of the present invention in its position corresponding to the open position of the pressure cooker.

Turning to the drawings, FIGS. 1 to 11 show a safety device of the present invention fitted to a pressure-cooking appliance with a bayonet closure, constituting a pressure cooker.

In a conventional manner, the pressure cooker comprises a pan 1 that is generally cylindrical, being defined by a pan wall 1A having a series of pan ramps 2 in its top portion for co-operating with a lid 3 that is likewise provided at its periphery with a series of lid ramps 4 to constitute a pressure cooker of the bayonet closure type. The pan ramps 2 and the lid ramps 4 are defined by conventional profiles each including two lateral edges, 2A and 4A, and peripheral edges, 2B and 4B.

The pan 1 and the lid 3 are made in a conventional manner from metal, such as stainless steel or aluminum, and they are made by stamping, for example.

For handling purposes, the pressure cooker is fitted with handle members, e.g. a pair of handles 5 secured to the pan 1 and fixed in diametrically opposite positions on the wall 1A. In the pressure cooker shown in FIGS. 1 to 11, the lid 3 is provided on its outer top face, substantially in the middle thereof, with a handle 6 enabling the lid 3 to be held and to be rotated.

In a conventional manner, the safety and locking/unlocking device of the present invention includes rotary abutment means for preventing the lid 3 from rotating relative to the pan 1 and disposed so that in the closed position the lid ramps 4 engage the pan ramps 2, the lid 3 and the pan 1 then being prevented from rotating in the direction of rotation that corresponds to closing the appliance. The rotary abutment means can be implemented in the form of a series of complementary shapes, e.g. by means of a notch or indentation 8 (FIG. 1) formed in the peripheral portion of the lid 3 for coming into abutment against a pan ramp 2 by being rotated from a starting position.

The safety and locking/unlocking device of the present invention also includes locking means 10 for locking the lid 3 relative to the pan 1, and mounted to move relative to the appliance, specifically the pressure cooker, under drive from control means 11 (e.g. FIGS. 1 and 7) suitable for being actuated by the user between at least one unlocking position enabling the appliance to be opened, and at least one locking position in which rotation of the lid 3 relative to the pan 1 is prevented. The locking means 10 acts by preventing the lid 3 from rotating relative to the pan 1 in the direction for opening the appliance. In association with the abutment means 8, it ensures that the pan and the lid are locked together by preventing any relative rotation between these two pieces.

Figure 4:
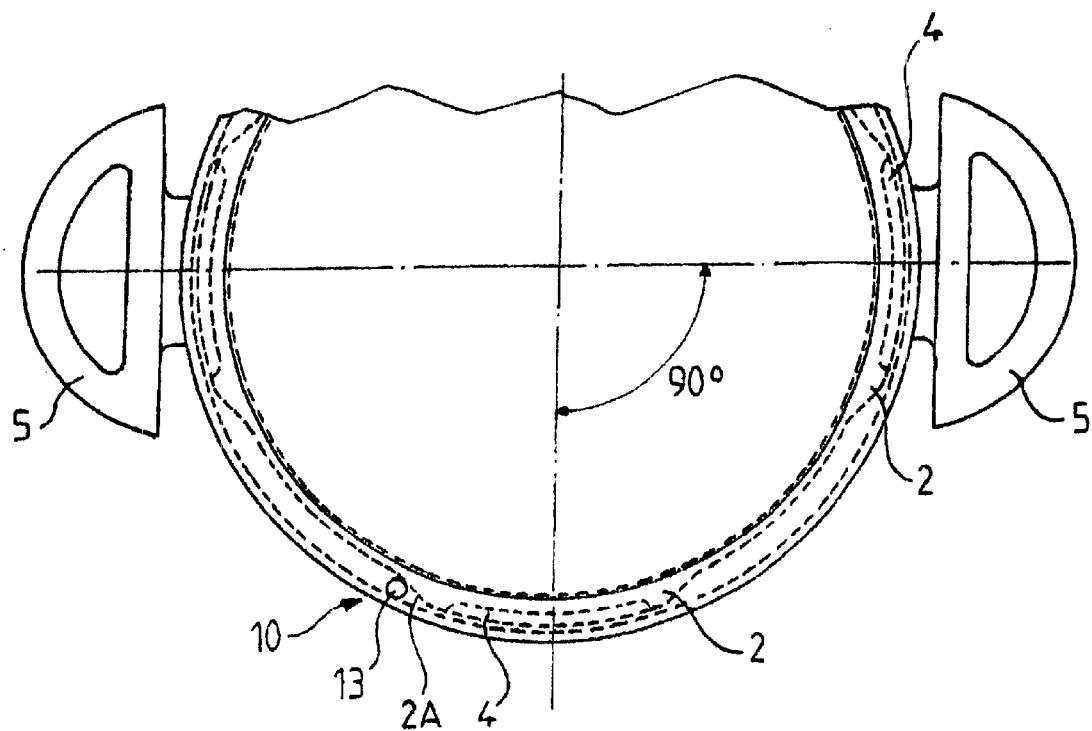
FIG. 4 is a top, fragmentary plan view showing the safety device of the present invention in a position corresponding to the pressure cooker being closed and locked.

According to the present invention, the locking means 10 is mounted to move in translation along the wall of the pan wall 1A in the inter-ramp zone (FIGS. 2, 5, and 9) so that in the locking position it bears against the lateral edge 2A of one of the pan ramps 2. In this disposition, the locking means 10 extends substantially parallel to the wall of the pan 1, on its outside and at a distance from the wall in the zone between the pan ramps 2 and the lid ramps 4 as defined by the annular zone between two diameters, namely the diameter defined by the top edge of the pan wall 1A of the pan and the diameter defined by the drop edge 3A of the lid 3 (FIG. 2). In this manner, and as can be seen in FIGS. 3 and 4, for example, the locking means 10 can come into the locking position shown in FIG. 4 when the lid 3 is in its abutment position defined by the abutment means 8. In this position, the pan ramps 2 and the lid ramps 3 are superimposed and in engagement, such that in the vicinity thereof the inter-ramp zone is empty, and it is thus possible for the locking means 10 to pass therethrough. After the locking means 10 has moved in translation, for example, preferably vertically, it is thus close to and in a position flush with the lateral edge 2A of the pan ramp 2. The lid 3 and the pan 1 are then prevented from rotating relative to each other in both directions of rotation.

In a particularly advantageous version of the present invention, the locking means 10 and the control means 11 are mounted on the lid 3 and are integrated, for example, in or on a block 12 which is preferably integrated in a removable unitary assembly (FIG. 1) that is mounted on the lid 3 and that is independent of the handles 5. The unitary assembly or the block 12 is mounted, e.g. by screwing, on the top face of the lid 3, in any zone outside of the handles 5 of the pan. The active safety unit formed by the unitary assembly 12, forming a control panel, is thus secured to the lid 3 and can be secured to or removed from the lid 3 as desired. Its position on the appliance also disengages it completely from the position and shape of the handles. Overall, the total size of the appliance is reduced, it is easier to handle, and generally safer to use.

In another particularly advantageous variant of the present invention, the locking means 10 is formed by a pin, e.g. a cylindrical metal pin, mounted on the lid 3 substantially parallel to the wall of the pan 1, and it is mechanically and functionally connected to the control means 11. For example, within the block 12, the pin 13 can be supported by a support plate 14.

According to the present invention, the control means 11 includes a selector knob 15 mounted to rotate on the block 12 between at least two positions, and preferably between three or four positions, the knob acting directly or indirectly on the locking means 10. In a preferred variant of the present invention, the selector knob 15 acts indirectly on the control means 11, specifically on the pin 13, by means of a lever (e.g. FIGS. 6, 8, 10, and 11) hinged between the knob and the control means, and providing a mechanical interface between the selector knob 15 and the locking means 10. The movement in translation of the pin 13 in a substantially vertical direction is obtained by rotating the lever 16. The lever is hinged, substantially halfway along, by a pivot 17 and has one end that flares to form a circular arc 18 designed to engage the control means 10, and in particular the top portion of the pin 13. The preferred mounting is such that the end 18 engages in a slot 19 (FIG. 2) of substantially helical shape that is formed in and at the periphery of the pin 13 so that by rotating about its pivot 17 the pivoted lever 16 moves the pin 13 in translation from its locking position to its unlocking position, and vice versa. It is also possible to envisage reversing this mechanical mount with the sloping control ramp being formed on the end 18 for moving the pin 13, or indeed to make a slot in the end 18 and a ramp on the pin 13. The mounting must thus be designed so that the end 18 engages and co-operates with the pin 13 by means of helically-shaped co-operation means disposed respectively on the pin 13 and on the end 18 to move the pin 13 longitudinally.

Figure 7:
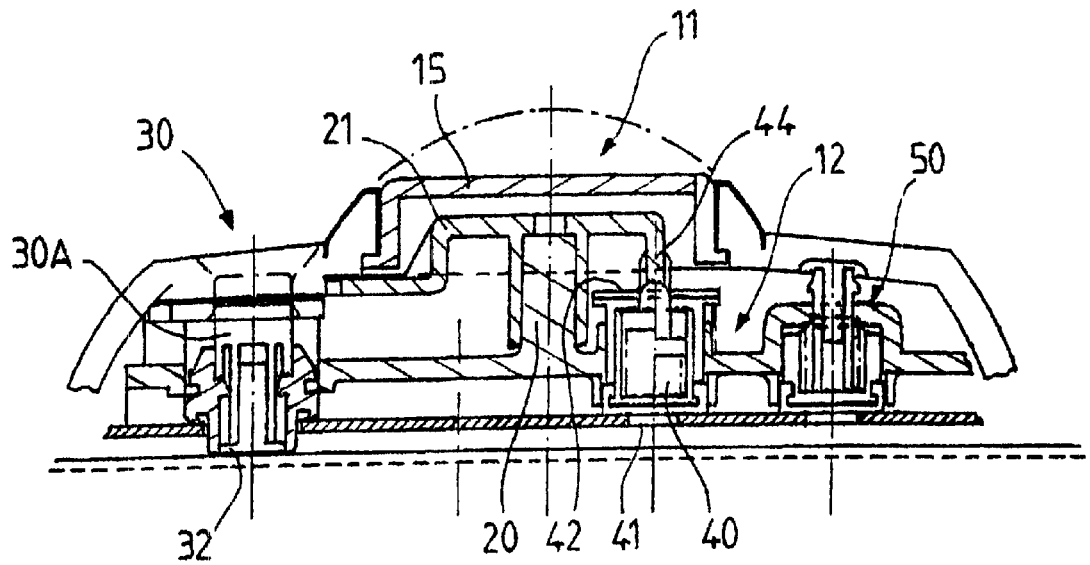
FIG. 7 is a side, elevational, fragmentary cross-sectional view showing a detail of the safety device of the present invention in its locking position without pressure.

As shown, for example, in FIG. 7 and in FIGS. 6, 8, 10, and 11, the selector knob 15 is mounted to rotate on the block 12 by means of a substantially vertical central pin 20. A collar 21 is angularly secured to the pin 20 and is of sufficient size to extend over and cover at least part of the second end 22 of the pivoted lever 16, over an angular sector of rotation. The second end 22 extends in part beneath the collar 21, and towards its end edge it includes a vertical finger 23 mounted to engage in a guide slot formed in the collar 21, which slot has a circular portion 25 and a radial portion 26. By means of this configuration, the vertical finger 23 is guided in the guide slot, and depending on how the selector knob 15 is rotated, the lever 16 can be caused to move in rotation about its pivot axis 17.

According to a characteristic of the present invention, the safety device also has a pressure indicator 30 mounted to move freely on the lid 3, preferably in or on the block 12 so that it moves in a seat receiving it between a high position and a low position, depending on the high or low pressure that exists within the appliance. The high position is leakproof, and the low position provides leakage.

The pressure indicator 30 is in the form of a cylindrical peg 30A mounted to move in vertical translation in a seat 31, itself secured to the plate 14 included in the block 12, for example. The bottom orifice 32 of the seat 31 opens out through the lid 3 into the enclosure constituted by the pan of the pressure cooker. The cylindrical peg 30A and the seat 31 are shaped so that when the cylindrical peg 30A is in its high position it presses in a leakproof manner against the seat 31, whereas when it is in its low position it is possible for pressure to leak out. The low position thus corresponds to a pressure-leakage position.

As shown in particular in FIGS. 6, 8, 10, and 11, the pressure indicator 30, the locking means 10, and the control means 11 are advantageously organized and mounted relative to one another in such a manner that:

when the control means 11 and the locking means 10 occupy their unlocking positions, the control means 11 prevents the pressure indicator 30 from moving away from its low position; and when the control means 11 and the locking means 10 occupy their locking positions corresponding to the opening position of the appliance, the control means 11 leaves the pressure indicator 30 free to move, but is capable of being held in the locking position if the indicator 30 is in its high position.

In the present invention, the control means 11 comprises, as described above, a selector knob 15 mechanically and functionally associated with the locking means 10 by means of the pivoted lever 16 acting through its end 18 on the locking means 10 to displace it. In addition, the pivoted lever 16 also acts through its end 18 on the pressure indicator 30 to lock it in the low position.

Figure 8:
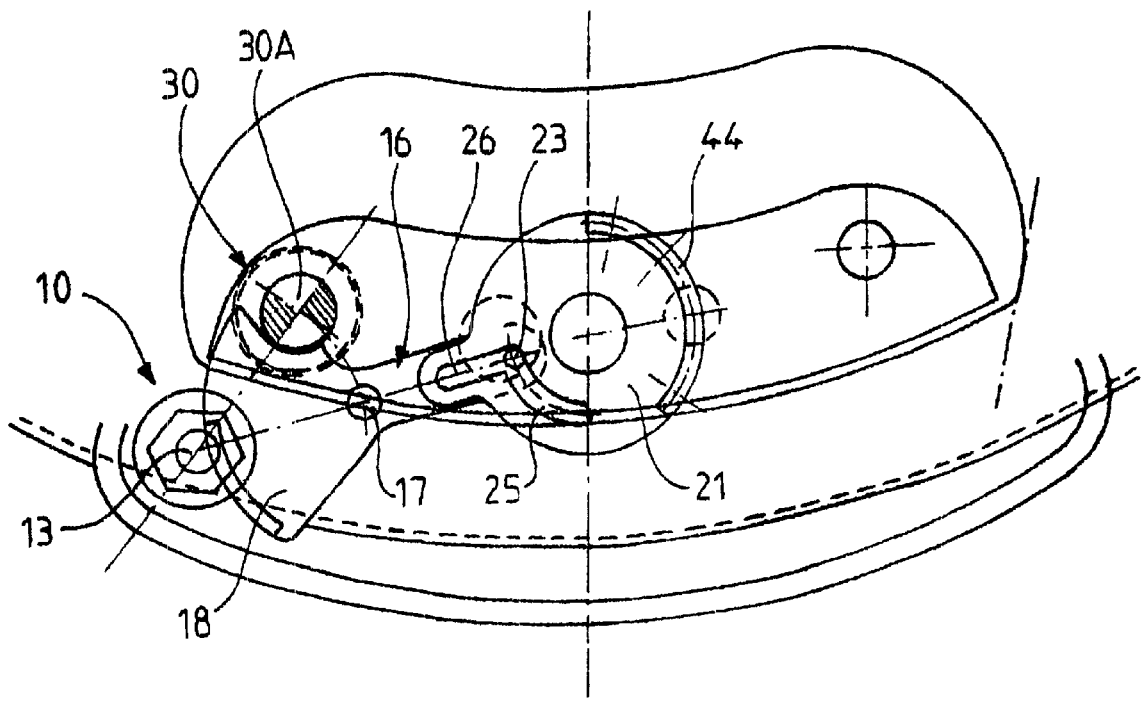
FIG. 8 is a top, elevational, fragmentary plan view showing the positions of the various members making up the safety device of the present invention in a locking position without pressure, identical to that of FIG. 7.
Figure 10:
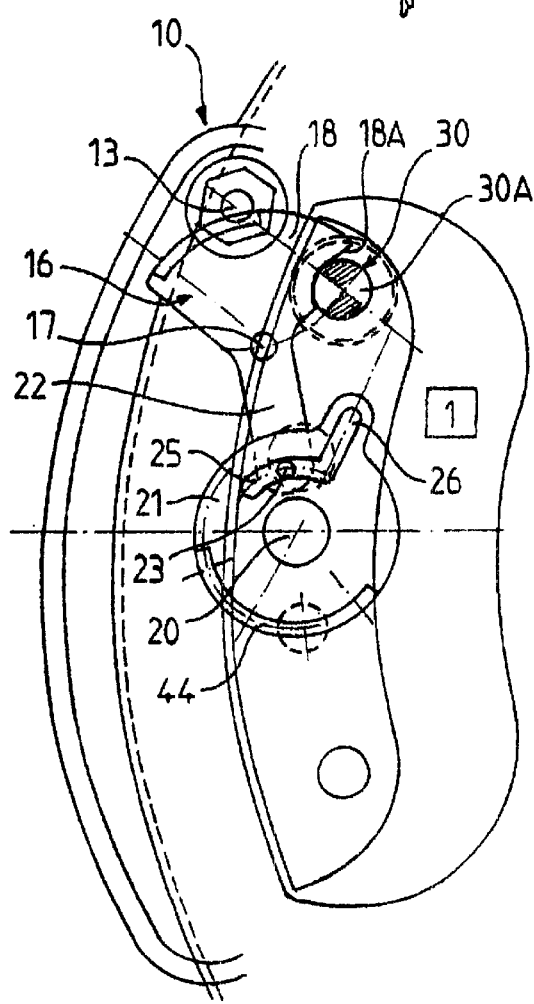
FIG. 10 is a top, elevational fragmentary plan view showing the respective positions of the various members of the safety device of the present invention in a first rated position of the operating valve.
Figure 11:
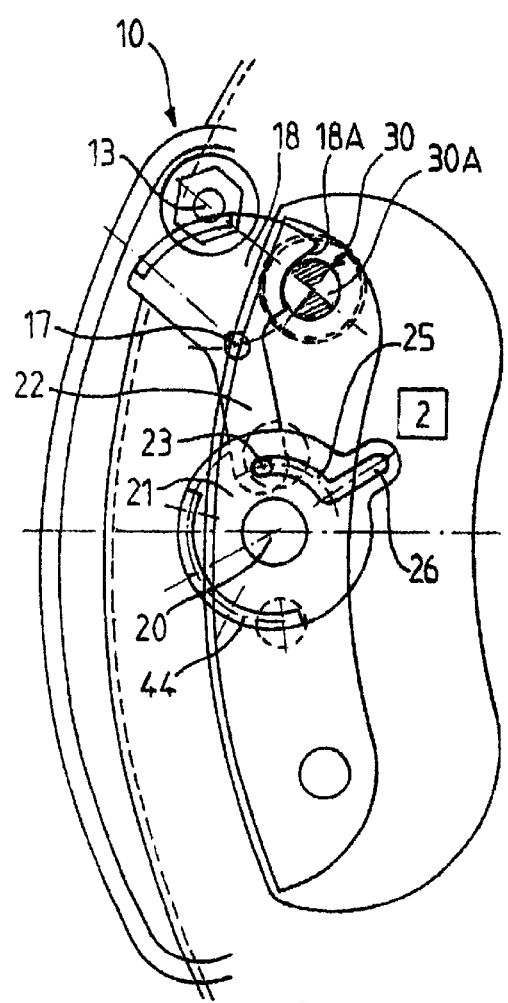
FIG. 11 is a top, elevational, fragmentary plan view showing the respective positions of the various members of the safety device of the present invention in a second rated position of the operative valve.

To this end, the pressure indicator 30 is mounted relative to the pivoted lever 16 so that its end 18 covers the pressure indicator 30, specifically the cylindrical peg 30A, when the selector knob 15 is in the unlocking position (FIG. 6) to prevent it from rising. In order to reach this unlocking position, corresponding to the selector knob 15 being in a position referenced 0 in FIGS. 1 and 6, the pivoted lever 16 has been pivoted in the direction marked F1 in FIG. 6, causing the pin 13 to move vertically upwards, and it has come to cover the cylindrical peg 30A while in its low position. In this position, the pressure indicator 30 is in its pressure-leakage position and it is prevented from moving by the presence of the end 18. It is thus possible to open or close the pressure cooker. However, the end 18 of the pivoted lever 16 is situated in the vicinity of the pressure indicator 30 so that in the locking position, e.g. corresponding to FIG. 8 (position referenced V in FIG. 1), the pressure indicator 30 is free to move, the lever when in this position being suitable for being locked against the pressure indicator 30. Advantageously, the end 18, when in this position, is laterally flush with the outer periphery of the pressure indicator 30. Advantageously, as shown in FIGS. 8, 10, and 11, the convex circularly-arcuate end 18 has a curved side edge 18A, e.g. in the form of a concave circular arc, for matching the shape of the periphery of the cylindrical peg 30A. In all of the positions shown in FIGS. 8, 10, and 11, corresponding respectively to the positions marked V, I, and II in FIG. 1, the locking means 10 is in its low locking position and the pressure indicator 30 can move upwards freely. If a minimum amount of pressure exists within the enclosure of the pressure cooker, it becomes impossible for the user to place the selector knob 15 in the opening position since the pressure indicator 30 in its high position limits rotation of the pivoted lever 16.

In a particularly advantageous variant of the present invention, the control means 11 is mechanically and functionally associated by means of the selector knob 15 with a rated operating valve 40 (FIG. 7) for the purpose of setting the rating.

The rated operating valve 40 is mounted in or on the block 12, and in conventional manner it is mounted to move freely in a resilient manner by resilient means such as a helical spring (not shown in the figures) within the seat. The rated operating valve 40 is also subjected to the internal pressure that exists inside the enclosure of the pressure cooker by means of an orifice 41 situated towards its bottom portion and opening out into the pan 1. The top portion 42 of the rated operating valve 40 is in contact with the selector knob 15 so as to be driven thereby. In the embodiment shown in FIG. 7, the selector knob 15 is in contact with the rated operating valve 40 by means of the collar 21 which acts by mans of a cam profile 44 on the top portion 42.

Advantageously, the cam profile 44 is designed so as to act on the rated operating valve 40 against its resilient means in at least two set positions. Thus, the selector knob 15 acts on the rated operating valve 40 by occupying two positions corresponding, respectively:

to the locking position V (e.g. FIG. 1) in order to release it from any resilient compression against the resilient compression means (the operating valve 40 is thus subjected only to the action of its own weight); and to a first compression position representative of a first rated value, e.g. corresponding to the appliance operating at a relative pressure limited to about 550 millibars.

Advantageously, the selector knob 15 acts on the rated operating valve 40 in a second compression position (FIG. 11) also representative of a second rating value for the resilient means, e.g. corresponding to the appliance operating under a limiting pressure of about 900 millibars relative. In the locking position of the locking/unlocking system of the present invention, the cam profile 44 is flush with the top portion 42, for example, in such a manner as to exert no compression on the resilient means, thereby releasing the rated operating valve 40. The cam profile 44 is then regularly inclined obliquely so as to compress the resilient means by increasing amounts corresponding to the two rated positions as defined above and to the two rotary positions of the selector knob 15. Naturally, it is possible to envisage a device that has more than three operating positions for the operating valve without thereby going beyond the ambit of the present invention.

Finally, and as shown in FIG. 7 for example, the safety device of the present invention can also include auxiliary safety devices, such as a safety valve 50.

In accordance with the present invention, the locking means 10, the control means 11, and the rated operating valve 40 are integrated in a unitary assembly including the block 12 which is removably mounted on the lid 3 by any appropriate means, e.g. by screws.

Figure 5:
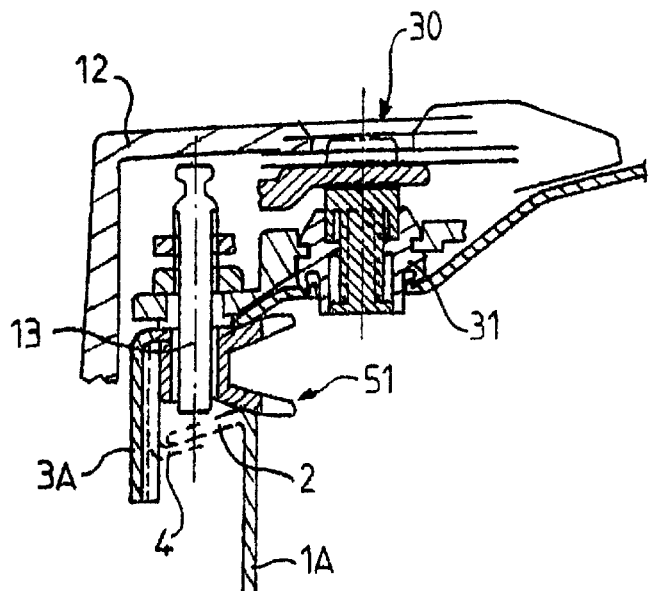
FIG. 5 is a side, elevational, fragmentary cross-sectional view taken along line V—V of FIG. 6, showing a detail of the safety device of the present invention, in its opening position.
Figure 6:
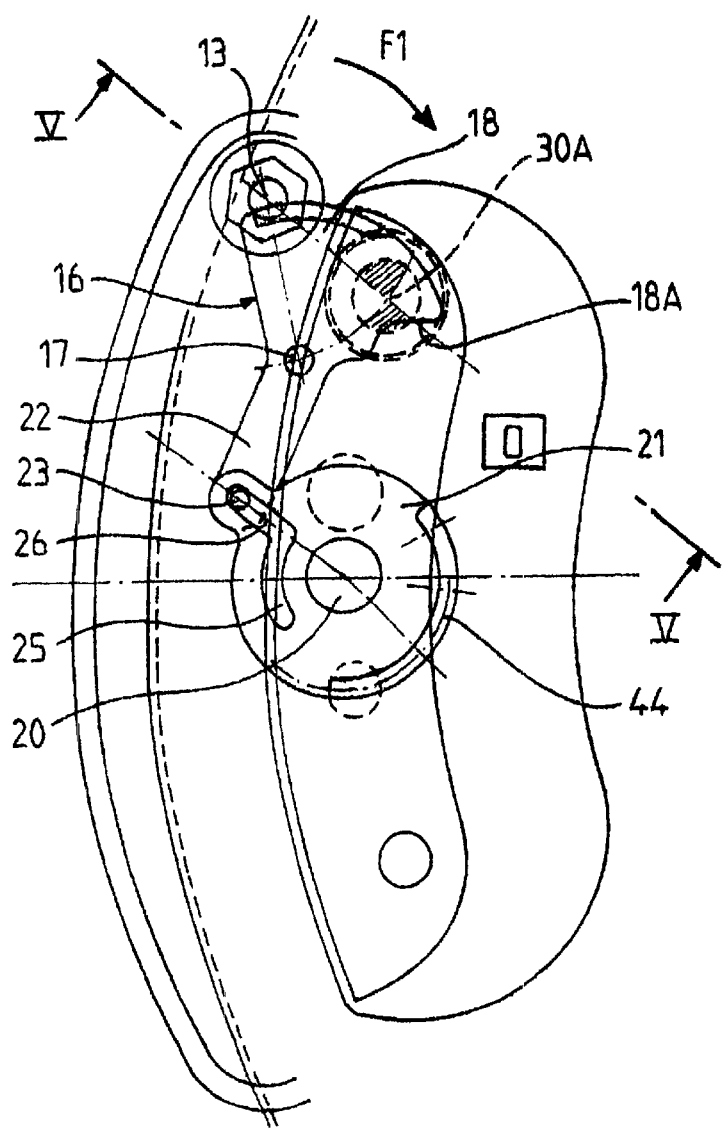
FIG. 6 is a top, partially sectional plan view with the positions of the various members making up the safety device of the present invention being in the same opening position as shown in FIG. 5.
Figure 9:
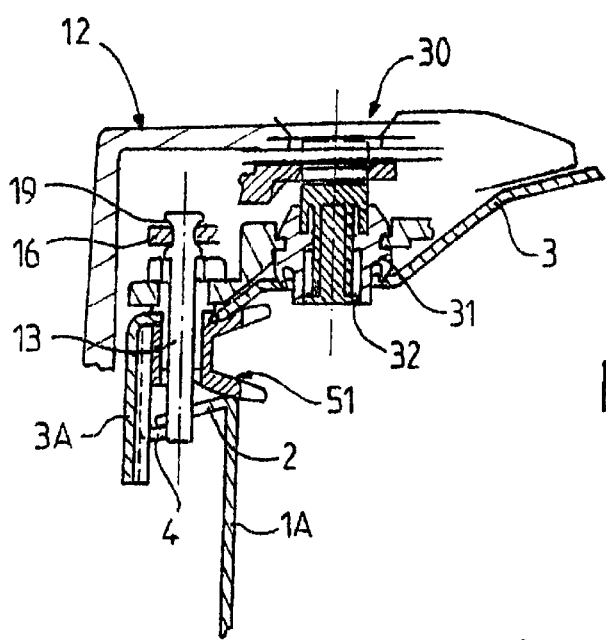
FIG. 9 is a side, elevational, fragmentary cross-sectional view showing the locking position of the safety device of the present invention.

In a preferred variant of the present invention, as shown in FIGS. 2, 5, and 9, for example, the locking means 10, and specifically the pin 13, passes through a sealing gasket 51 mounted in a conventional manner between the lid 3 and the pan 1. Advantageously, the pin 13 passes through the sealing gasket 51 to act as means for indexing the gasket and for preventing it from rotating in the lid 3. In a conventional manner, the sealing gasket 51 is made of an elastomer material and has two lips 52 and 53, for example. The sealing gasket 51 has a hole 54 formed through its main body in such a manner that in the unlocking position, the sealing gasket 51 can be engaged on the pin 13 by means of the hole 54. This prevents the sealing gasket 51 from rotating in the lid 3.

The locking/unlocking mechanism of the present invention operates as follows.

To close and open the appliance, the selector knob 15 must be moved by the user into its opening position marked O. In this position (e.g. FIGS. 5 and 6), the pin 13 is in its high position and the pressure indicator 30 is necessarily in its low position since the pivoted latch 16 limits vertical displacement thereof since the curved portion 18 overlies said indicator. The pressure inside the appliance cannot be raised since the pressure indicator 30 is in its low position in which it is possible for pressure to leak out between the pan 1 and the lid 3. It is thus possible for the user to open and close the appliance, without taking any particular precautions, by rotating the lid 30, e.g. in the direction F2 shown in FIG. 1, so as to reach the position shown in dashed lines in FIG. 1.

To close the appliance, the user must firstly position the lid 3 on the pan 1 in the position shown in dashed lines in FIG. 1. The user then rotates the lid 3 in the direction opposite to arrow F2 so that it takes up the position shown in continuous lines in FIG. 1. To close the appliance, the selector knob 15 (which during all the preceding operations has been in the position marked O) is turned by the user into the locking position marked V, as shown in FIG. 8. While it is being rotated, the selector knob 15 rotates the pivoted lever 16 which firstly uncovers the pressure indicator 30, and secondly moves the pin 13 downwards. The movement of the end 18 in the guide slot of the pin 13 causes the pin 13 to move downwards substantially vertically and locks the lid 3 for rotation relative to the pan 1 since the pin 13 comes flush against the lateral edge 2A of the pan ramp 4 (FIG. 4). If the user wishes to open the appliance, then the selector knob 15 must be turned to position O. Furthermore, the pressure indicator 30 is free to move upwards. Nevertheless, since the selector knob 15 is in its locking position V, the rated operating valve 40 is free to move without resilient constraint, which prevents the pressure inside the pressure cooker from rising.

In order to allow pressure to rise, the user must position the selector knob in the first rated position (FIG. 10). While moving into that position, the pivoted latch 16 remains stationary since the finger 23 can move freely in the circular portion 23 of the guide slot in the collar 21. Since the rated operation valve 40 is now elastically compressed, the pressure inside the appliance can rise. Depending on the type of cooking desired, the user can also position the selector knob 15 in the second rating position, as shown in FIG. 11, for example. In this second position, the pin 13 is still in its locking position, since the pivoted lever 16 has not moved, the finger 23 merely reaching its end position in the guide slot. Furthermore, with the pressure indicator 30 in its high position because of the pressure, it is impossible for the user to place the selector knob 15 in the opening position. While in its high position, the pressure indicator 30 prevents the pivoted lever 16 from rotating, thereby causing it to act as a latch.

If the user seeks to open the appliance, it is therefore necessary firstly to place the selector knob 15 in the locking position V where the rated operating valve 40 becomes free to allow steam to escape, thereby causing the pressure contained inside the appliance to drop. Once the pressure has dropped below a value of about 0.5 kPa, for example, the pressure indicator 30 returns to its low position, thereby enabling the user to turn the selector knob 15 into the opening position O. The pivoted lever 16 can now be rotated so as to reach the position O (FIG. 6), thereby enabling the pin 13 to move upwards in translation under drive from the pivoted lever 16. The pin 13 thus reaches its unlocking position, thereby enabling the pressure cooker to be opened in complete safety, all pressure having been evacuated previously.

The present invention consequently makes it possible to lock the pan and the lid together directly and to obtain complete safety for the appliance since the pressure cannot raise inside the appliance if it is poorly closed, and it can be opened only by necessarily passing initially via the locking position V in which any remaining excess pressure within the pressure cooker is evacuated. In addition, the appliance can be opened only if the internal pressure within the appliance tends to zero. The locking mechanism is also independent of the handles of the pan, thereby simplifying construction of the appliance.

The industrial application of the present invention is in the manufacture of household pressure-cooking appliances, in particular pressure cookers.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim:

1. A pressure cooker comprising a pan including a pan ramp, a lid including a handle and a lid ramp cooperative with said pan ramp to provide a bayonet closure, whereby said pan and said lid can move from an open position wherein said pan ramp and said lid ramp are not cooperatively engaged to a closed position wherein said pan ramp and said lid ramp are cooperatively engaged by rotating said lid in a first direction with respect to said pan, rotary abutment means for preventing further rotation of said lid relative to said pan in said first direction when said pan and said lid are in said closed position, a lock mechanism for locking said lid relative to said pan, a controller for controlling said lock mechanism, said controller adapted to move said lock mechanism between at least one unlocking position wherein said lid can be removed from said pan and at least one locking position wherein said lid cannot be removed from said pan, a pressure indicator mounted with respect to said lid and movable between a first position wherein pressure within said pressure cooker cannot leak therethrough and a second position wherein said pressure can leak therethrough, and a unitary assembly mounted on said lid independent of said handle, said pressure indicator, said controller and said lock mechanism being mounted on said unitary assembly.

2. The pressure cooker of claim 1 wherein said unitary assembly is removably mounted on said lid.

3. The pressure cooker of claim 1 wherein when said controller has moved said lock mechanism into said at least one unlocking position, said controller prevents said pressure indicator from moving out of said second position and when said controller has moved said lock mechanism into said at least one locking position, said pressure indicator is free to move into said first position and said lock mechanism is thereby restrained in said at least one locking position.

4. The pressure cooker of claim 1 wherein said controller includes a selector knob, and a lever operable by said selector knob, said lever including an end portion, said end portion of said lever movable by means of said selector knob to move said lock mechanism between said at least one unlocking position and said at least one locking position and to lock said pressure indicator in said second position.

5. The pressure cooker of claim 4 wherein said lock mechanism comprises a pin translatable with respect to said pan between a first upper vertical position and a second lower vertical position, said end portion of said lever comprising a helical shape for cooperating with said pin to move said pin between said first and second vertical positions.

6. The pressure cooker of claim 4 wherein said end portion of said lever covers said pressure indictor to lock said pressure indicator in said second position and is movable to uncover said pressure indicator in a position adjacent to said pressure indicator enabling said pressure indicator to move into said first position whereby said end portion of said lever is locked against said pressure indicator.

7. The pressure cooker of claim 4 including a rated operating valve for setting the rating of said pressure cooker by compression thereagainst, said selector knob being operable to cause said controller to set said rating.

8. The pressure cooker of claim 7 wherein said selector knob includes a cam profile for moving said rated operating valve between at least two positions.

9. The pressure cooker of claim 8 wherein said at least two positions correspond to said locking mechanism being in said at least one locking position, said at least two positions including a first position wherein said rated operating valve is released from any resilient compression and a second position wherein said rated operating valve is subjected to a first compression representing a first rated value.

10. The pressure cooker of claim 9 wherein said at least two positions includes a third position, wherein said rated operating valve is subjected to a second compression representing a second rated value.

* * * * *